(12) United States Patent
Duval

(10) Patent No.: US 7,995,755 B2
(45) Date of Patent: Aug. 9, 2011

(54) METHOD FOR MANAGEMENT OF ACCESS MEANS TO CONDITIONAL ACCESS DATA

(75) Inventor: Grégory Duval, La Conversion (CH)

(73) Assignee: Nagravision S.A., Cheseaux-su-Lausanne (CH)

( * ) Notice: Subject to any disclaimer, the term of this patent is extended or adjusted under 35 U.S.C. 154(b) by 1452 days.

(21) Appl. No.: 11/218,605

(22) Filed: Sep. 6, 2005

(65) Prior Publication Data

US 2006/0064443 A1 Mar. 23, 2006

(30) Foreign Application Priority Data

Sep. 17, 2004 (EP) .................................... 04104509

(51) Int. Cl.
*H04N 7/167* (2006.01)
(52) U.S. Cl. .......... 380/227; 725/31; 713/192; 380/242; 380/239
(58) Field of Classification Search .................... 726/14; 380/239; 725/31
See application file for complete search history.

(56) References Cited

U.S. PATENT DOCUMENTS

| 4,719,566 | A | * | 1/1988 | Kelley | .......... 340/5.27 |
| 5,796,829 | A | | 8/1998 | Newby et al. | |
| 6,516,465 | B1 | | 2/2003 | Paskins | |
| 2004/0123313 | A1 | * | 6/2004 | Koo et al. | .......... 725/31 |

FOREIGN PATENT DOCUMENTS

EP 1109405 A 6/2001

OTHER PUBLICATIONS

"Functional model of a conditional access system", EBU Review—Technical, European Broadcasting Union. Brussels, BE, No. 266, (Dec. 21, 1995), pp. 64-77, XP000559450, ISSN: 0251-0936.
Carducci F. et al: "ISIS project: an open platform for multimedia interactive services", (Mar. 13, 1997), pp. 6-1, XP006509347.
European Search Report dated Feb. 22, 2005, for Priority Document EP04104509.7.
Song et al., "*Pay-TV System with Strong Privacy and Non-Repudiation Protection*," IEEE Transactions on Consumer Electronics, vol. 49, No. 2, pp. 408-413, May 2003.
Kohl et al., "*The Kerberos Network Authentication Service (V5)*," Network Working Group, Request for Comments 1510, Sep. 1993.

* cited by examiner

*Primary Examiner* — Gilberto Barron, Jr.
*Assistant Examiner* — Virginia Ho
(74) *Attorney, Agent, or Firm* — Harness, Dickey & Pierce, P.L.C.

(57) ABSTRACT

A method for management of access means to conditional access data may include: initiating, from a security module of a multimedia unit, a verification of the next renewal date of the access means, which are associated to time information and are controlled by a management centre; determining, in the security module, the next renewal date of the access means; if the next renewal date of the access means is closer than a preset duration, then sending a request from the security module to the multimedia unit that requests the renewal of the access means; sending the request for renewal of the access means from the multimedia unit to the management centre; verifying by the management centre, if the multimedia unit is authorized to renew the access means; and in the case of a positive response, sending of an access means renewal message to the multimedia unit.

9 Claims, 2 Drawing Sheets

METHOD FOR MANAGEMENT OF ACCESS MEANS TO CONDITIONAL ACCESS DATA

PRIORITY STATEMENT

This U.S. nonprovisional application claims priority under 35 U.S.C. §119 to European Patent 04104509.7 filed Sep. 17, 2004, in the European Patent Office, the entire contents of which are incorporated by reference.

FIELD OF THE INVENTION

This invention relates to an access means management method for conditional access data, this data being diffused in particular by satellite, by a terrestrial antenna network or by cable intended for at least one multimedia unit. In particular, this data can be Pay-TV data.

More particularly, it concerns the management of the access means to data when this access is carried out by means of a multimedia unit connected to a subscription with a fixed validity duration or a regularly renewable validity duration.

PRIOR ART

The validity conditions for access to Pay-TV services by means of a multimedia unit are stored in a security module. As it is well known to those skilled in the art, the security module can essentially be produced according to four different forms. One of these is a microprocessor card, a smart card, or more generally an electronic module (in the form of a key, badge, . . . ). This type of module is generally removable and connectable to the decoder. The form with electric contacts is the most widely used, but a connection without contact is not excluded, for example of the ISO 14443 type.

A second known form is that of an integrated circuit package, generally placed definitively and irremovably in the decoder box. An alternative is made up of a circuit mounted on a base or connector such as a SIM module connector.

In a third form, the security module is integrated into an integrated circuit package that also has another function, for example in a descrambling module of the decoder or the microprocessor of the decoder.

In a fourth embodiment, the security module is not produced in material form, but its function is only implemented in software form. Given that in the four cases, although the security level differs, the function is identical, we can talk about security modules regardless of the way in which its function is carried out or the form that this module can take.

Access conditions to Pay-TV services such as those previously mentioned can be a duration or a credit, for example. In the case of a subscription with a determined duration, in particular when this duration is relatively long, for example one year, it is not desirable to introduce rights or access means into the security module for the totality of the subscription duration. On the contrary, it is preferable to introduce rights or access means for only a fraction of the total duration. As an example, for a subscription with a duration of one year, rights for one month can be introduced. It is clear that before the expiration of the partial duration, it is necessary to renew the rights or the access means for the multimedia units concerned.

The introduction of the rights or the access means related to a fractioned subscription, prevents a subscriber from cancelling his/her rights after a relatively short usage time and allows, for example, by switching off the multimedia unit for a certain time, this multimedia unit not to receive the rights' cancellation messages which are intended for this unit. It should be noted that the term "access means" such as that used in the description below also encompasses access rights, that is to say the rights necessary to be able to decipher the data as well as the keys necessary for the deciphering of the data. The keys mentioned here can be used to decipher directly the data or more generally to decipher the data in an indirect way. This means that the key in question allows the deciphering of a message, for example a control message ECM, that contains keys, for example in the form of control words, allowing the deciphering of the data.

There are also security modules, generally removable, which give an access right to an event during a predefined duration and which require the reception of a rights' renewal message to continue receiving events or contents. Therefore, this type of module gives an access duration to events of 6 months but for security reasons, it is necessary to receive a rights' confirmation message (or right extension) for all the 30 days. With this type of module, the management centre does not know on which date the renewal message must be sent. In fact, the extension date depends on the date on which the user initially activated his/her security module.

With the existing systems, each time that the partial validity duration associated to a multimedia unit reaches the deadline, the management centre must send a renewal message of the access means. These messages are sent in the form of authorization messages EMM.

A problem is posed with this type of message. In fact, numerous multimedia units are only capable of processing these authorization messages when they are active, that is to say when they are neither turned off, nor on standby.

In order to guarantee that the majority of the multimedia units have correctly received an authorization message intended for them, it is necessary to repeat the sending of this type of message several times. This makes a non-optimal use of the available bandwidth. Moreover, the fact that the modem backward channels presently in existence between the multimedia units and the management centre are rather inconvenient, in particular since the modem must be connected in the vicinity of the multimedia unit, in general there are no means provided to indicate to the management centre which multimedia units have correctly received the rights' renewal message.

Another problem appears when a multimedia unit is not used during the period in which the renewal messages are sent. Given that this multimedia unit has not received the necessary access means, it will no longer be able to function. This obliges the subscriber to call a management centre so that the authorization messages are sent to him/her specifically.

The existing means do not allow the optimal management of the renewal messages, they involve an incorrect usage of the resources and are inconvenient for the user in the case that the unit is not used during a certain time.

This invention intends to overcome the drawbacks of the prior art processes by carrying out a process in which it is unnecessary to repeat unnecessary messages several times and in which the management of the authorization messages is thus optimized.

BRIEF DESCRIPTION OF THE INVENTION

The aim of the invention is achieved by a method for management of access means to conditional access data, this data being broadcasted to at least one multimedia unit, the access means being controlled by a management centre, and these access means being associated to a time information, said multimedia unit comprising at least one security module in which the access means to data are stored;
said multimedia unit also including remote communication means with the management centre and local communication means with said security module;
characterized in that it includes the steps of:
determination by the security module, of the next renewal date of the access means;
if the next renewal date of the access means is closer than a preset duration, then sending a request from the security module to the multimedia unit, requesting the renewal of the access means, this request using said local communication means;
sending by the multimedia unit of said request for renewal of the access means to the management centre, this request using said remote communication means;
verification by the management centre, if said multimedia unit is authorized to renew the access means;
in the case of a positive response, sending to said multimedia unit of an access means renewal message.

According to this invention, the request for access means renewal messages is managed by the multimedia unit itself and in particular by the security module that it contains. The latter controls the moment in which the request is sent in such a way that it is possible to arrange for the renewal message to be sent when there is a good chance that the multimedia will be working. The multimedia unit is also able to send a reception message indicating to the management centre that the renewal message has been received correctly. This prevents the management centre from sending unnecessary renewal messages.

It is also possible to diffuse in a conventional way, access means renewal messages when the validity duration for a group of multimedia units expires, for instance a few days before the end of the month. The process of the invention can then be used to send a confirmation message to the management centre. It is then possible to send rights' renewal messages, using the process of the invention, only to the multimedia units that have not received these messages in a conventional way. This ensures not only that the management centre does not send numerous unnecessary messages, but also ensures that the multimedia units work even after a prolonged period without use.

BRIEF DESCRIPTION OF THE DRAWINGS

This invention and its advantages will be better understood with reference to the annexed drawings and to the detailed description of a particular embodiment, in which.

DETAILED DESCRIPTION

With reference to these Figures, the process according to the invention is implemented by means of a system comprising essentially three entities, namely a management centre CG connected to a conditional access data supplier, a multimedia unit STB using said conditional access data and remote communication means ST between the management centre and the multimedia unit. The remote communication means can use a telecommunication satellite capable of communicating bi-directionally with the management centre CG as well as with the multimedia STB units in connection with this satellite. These communication means can also use a terrestrial antenna network and transmit data in conformity with standards DVB-T (Digital Video Broadcasting-Terrestrial) or DVB-H (Digital Video Broadcasting-Handheld). Generally, the events are transmitted to multimedia units in broadcast mode (that is to say that the same content is sent to a large number of units) while the feedback channel is generally a point-to-point channel. In this case, the return communication channel can use a conventional modem or a communication according to GSM standards (Global System for Mobile Communications) or GPRS (General Packet Service Radio) or other similar standards. The remote communication means can also use a cable network.

In the preferred embodiment of the invention, the access to data is connected to rights or access means acquired in the form of a subscription. In the description below, it is supposed that the subscription has a total duration of one year and that the rights are introduced in a fractionized way in time, for a duration of one month, for example. In a conventional way, these rights are stored in a security module SC connected to the multimedia unit.

Figure 1:
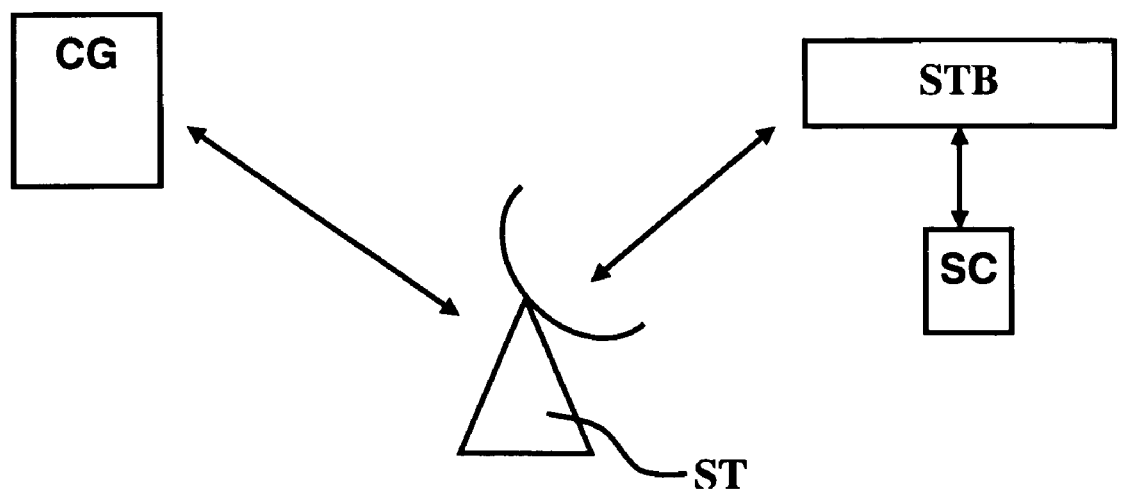
FIG. 1 shows the elements allowing the implementation of the process of the invention.
Figure 2:
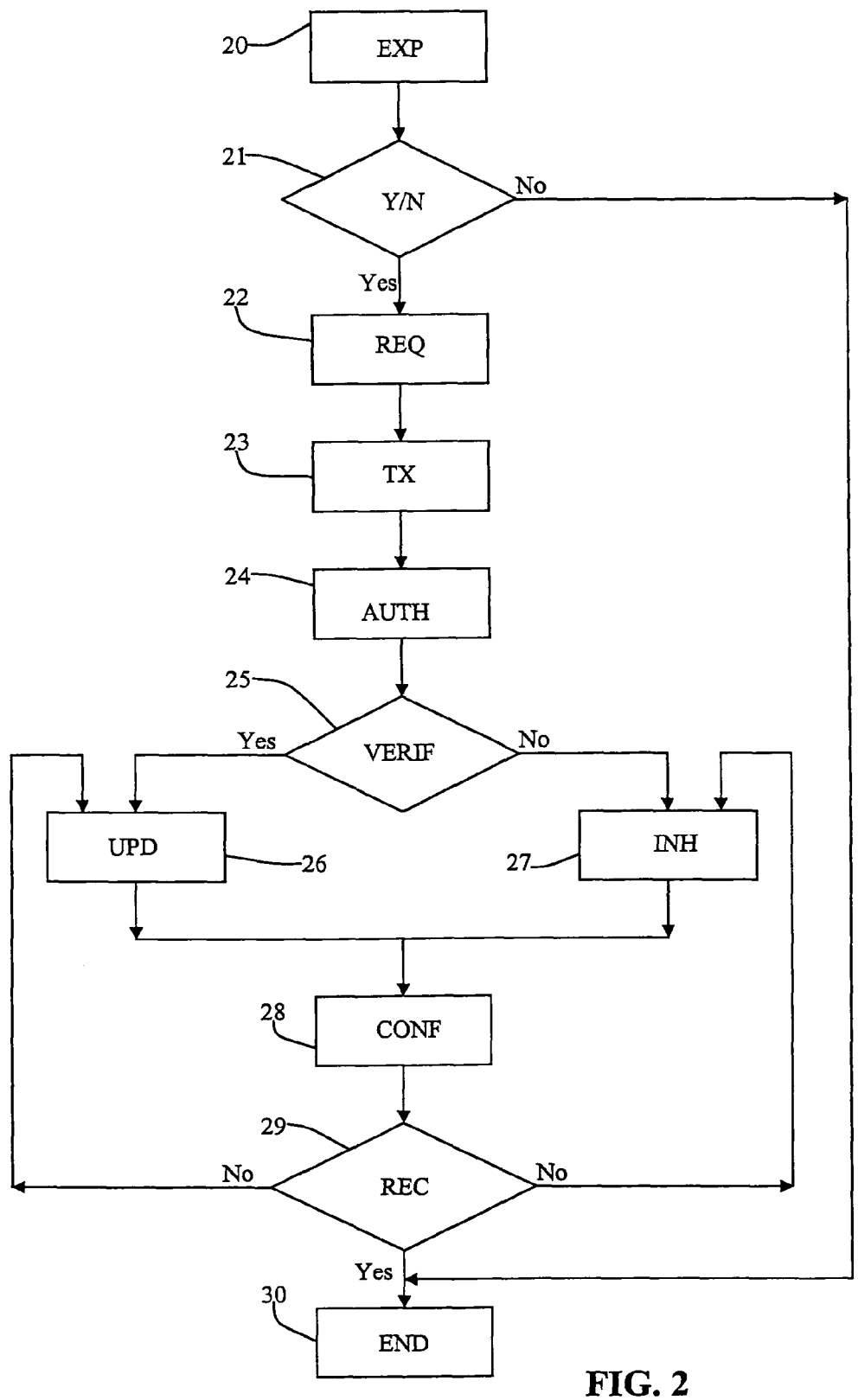
FIG. 2 schematically represents the steps of the process of the invention.

The process of the invention operates in the following way, with reference to the FIG. 2. According to predefined criteria, for example, when the multimedia unit is activated after a pause, this unit verifies if it still has the rights or access means to access the data. In the case of a positive response, it then verifies when the fractionized rights expire. This corresponds to the step with the reference 20. The unit then compares, during a step 21, the duration until the next renewal expiration of the access means with a preset threshold value, correspondent, for example, to 48 hours. If the comparison indicates that the next renewal deadline is further away than this threshold value, the multimedia unit operates in a conventional way. On the other hand, if the comparison indicates that the renewal deadline is closer than the threshold value, a renewal request is formed.

In the first time, a request is formed by the security module that transmits it to the multimedia unit by local communication means. This corresponds to step 22. This request is then transmitted to the management centre, possibly after modification, processing, and preparation by the multimedia unit. This step has the reference 23. For this, the multimedia unit uses the remote bi-directional communication means that pass through the telecommunication satellite, an antenna of the terrestrial antenna network, or a cable. This request contains at least one identifier of the transmitting multimedia unit and an authentication element. The identifier is advantageously sent in clear so that the management centre can determine the origin of the message. However, this identifier could also be enciphered by means of a key common to all the multimedia units connected to the management centre. The authentication element is preferably enciphered by means of a key known from the management centre and the multimedia unit. This key is advantageously specific to each multimedia unit. It can be symmetrical or asymmetrical. This authentication element could be the enciphered identifier. In this way, when the management centre receives a message, the identifier in clear allows the origin of the message to be known, which allows the determination, for example, in a key table stored in the management centre, of the key that corresponds to the transmitting multimedia unit. If the authentication element corresponds to the enciphered identifier, the identifier in plaintext is then enciphered in the management centre by way of the corresponding key and compared to the authentication element received by the remote communication means. It is clear that other authentication procedures can also be used, for example, by means of hashing functions. This authentication corresponds to step 24 in FIG. 2.

When the management centre has identified and authenticated the multimedia unit that has emitted the request, it then verifies, during a step 25, the rights associated to this multimedia unit. These rights are stored in a database of the management centre and indicate the total duration of the subscription as well as the partial or fractionized duration and possibly the date from which the fractionized renewal can be carried out. If the conditions for renewal are fulfilled, that is to say in particular if the total duration of the subscription has not expired, the new access means can be transmitted during step 26 to the multimedia unit that has made the request.

These access means can be sent in two distinct modes. According to one of these, they are inserted into the data flow diffused to all the units. This type of message can be encrypted by a global key or by a key specific to the concerned multimedia unit (more particularly, to its security module). The concerned multimedia unit is the only one capable of processing the message(s) in order to extract the access means, that is to say the rights or the keys in particular.

According to a second method, the access means are sent by means of the point-to-point connection that is formed between the multimedia unit and the satellite, an antenna of the terrestrial antenna network or the cable. Therefore, only the corresponding multimedia unit receives individually the necessary authorization messages.

When the authorization messages EMM containing the access means have been received by the multimedia unit, they are transmitted to the security module by local communication means possibly after processing by the multimedia unit. They are then stored in this security module.

If the renewal conditions are not fulfilled, namely the multimedia unit that has emitted the request no longer has the rights to renew its subscription, two different embodiments are possible. According to one of the embodiments, the management centre does not send anything to the multimedia unit. According to another embodiment, illustrated by reference 27, the management centre sends an inhibitory message to the transmitting multimedia unit. This message, which is also transmitted by the remote communication means, has the function of preventing the multimedia unit from re-sending a renewal request message while such a renewal is no longer authorized. This prevents the sending of unnecessary messages. It is also possible to send to the subscriber a message proposing the renewal of his/her subscription and/or explaining the way to proceed.

According to one advantageous embodiment, when the multimedia unit has received a message, whether it is a renewal message or an inhibitory message, and has been capable of processing it correctly, said unit informs the management centre. For this, it sends a confirmation message, during step 28, using the same communication channels as for the sending of the request. If the management centre has received the confirmation message, which is verified during step 29, the process stops, which corresponds to step 30, and the access to data is carried out conventionally. If the confirmation message is not received, the message is repeated until a confirmation is sent. This message can be the renewal message of the access means or the inhibitory message. The sending of this confirmation message prevents the management centre from repeating many times the sending of messages that have already been received.

This invention includes several advantages with reference to the processes of the prior art. In fact, entrusting the management of the sending of the renewal messages to the multimedia unit and not to the management centre allows a success rate with respect to the reception of the renewal messages to be achieved that is considerably greater than in the systems of the prior art. Indeed, it is possible to force the multimedia unit to verify the next renewal expiration date during each of its activations. If a renewal message is sent a short time after this activation, there is a high possibility that it can be processed. In fact, the multimedia unit will certainly still be functioning. Furthermore, as the majority of the messages are correctly processed, the use of the bi-directional communication means allow the detection only of the messages that have not been well received. This prevents the sending of a large number of unnecessary messages.

The invention claimed is:

1. A method for management of access means to conditional access data, the conditional access data being broadcasted to at least one multimedia unit, the access means being controlled by a management centre, and the access means being associated to a time information, the multimedia unit comprising at least one security module in which the access means to data are stored;
the multimedia unit also including remote communication means with the management centre and local communication means with the security module;
the method comprising:
initiating a verification of the next renewal date of the access means, the initiation coming from the security module;
determining, in the security module, of the next renewal date of the access means;
determining, in the security module, a difference between a current date and the next renewal date of the access means;
if the difference between the current date and the next renewal date of the access means is less than a predefined time interval, then sending a request from the security module to the multimedia unit, using the local communications means, that requests the renewal of the access means;
sending the request for renewal of the access means from the multimedia unit to the management centre, using the remote communication means;
verifying by the management centre, if the multimedia unit is authorized to renew the access means; and
in the case of a positive response, sending of an access means renewal message to the multimedia unit.

2. The method of claim 1, wherein the access means are rights connected to the access to the data.

3. The method of claim 1, wherein the access means includes at least one key allowing deciphering of the data.

4. The method of claim 1, further including:
sending an inhibitory message, with an aim of preventing the multimedia unit from sending a new access means renewal request, when the verifying by the management centre has indicated that the multimedia unit is not authorized to renew the access means.

5. The method of claim 1, wherein the access means renewal request contains at least one identifier of the multimedia unit having issued the access means renewal request.

6. The method of claim 1, wherein the access means renewal request contains at least one authentication element allowing authentication of the multimedia unit having issued the access means renewal request.

7. The method of claim 1, wherein the multimedia unit sends a confirmation message to the management centre by the remote communication means when the multimedia unit has received the access means renewal message, and
wherein the management centre repeats the sending of the access means renewal message until the management centre has received the confirmation message.

8. The method of claim 1, wherein the data is broadcasted by satellite, and
wherein the remote communication means with the management centre uses the satellite.

9. The method of claim 1, wherein the access means renewal message is broadcast to a plurality of multimedia units, including the multimedia unit.

* * * * *

UNITED STATES PATENT AND TRADEMARK OFFICE
CERTIFICATE OF CORRECTION

PATENT NO. : 7,995,755 B2  
APPLICATION NO. : 11/218605  
DATED : August 9, 2011  
INVENTOR(S) : Grégory Duval Page 1 of 1

It is certified that error appears in the above-identified patent and that said Letters Patent is hereby corrected as shown below:

Title Page, Item (30) should read

(30) Foreign Application Priority Data

September 17, 2004    (EP).....................04104509.7

Signed and Sealed this
Eighteenth Day of October, 2011

David J. Kappos
*Director of the United States Patent and Trademark Office*